Nov. 8, 1949 A. L. BROWNLEE ET AL 2,487,095
MOUNTING FOR STATORS OF FLYWHEEL MAGNETOS
Filed Sept. 22, 1948 3 Sheets-Sheet 1

INVENTORS
ALLEN L. BROWNLEE AND
GEORGE F. MCGREVY
BY Chapin + Neal
ATTORNEYS

Nov. 8, 1949  A. L. BROWNLEE ET AL  2,487,095
MOUNTING FOR STATORS OF FLYWHEEL MAGNETOS
Filed Sept. 22, 1948  3 Sheets-Sheet 2
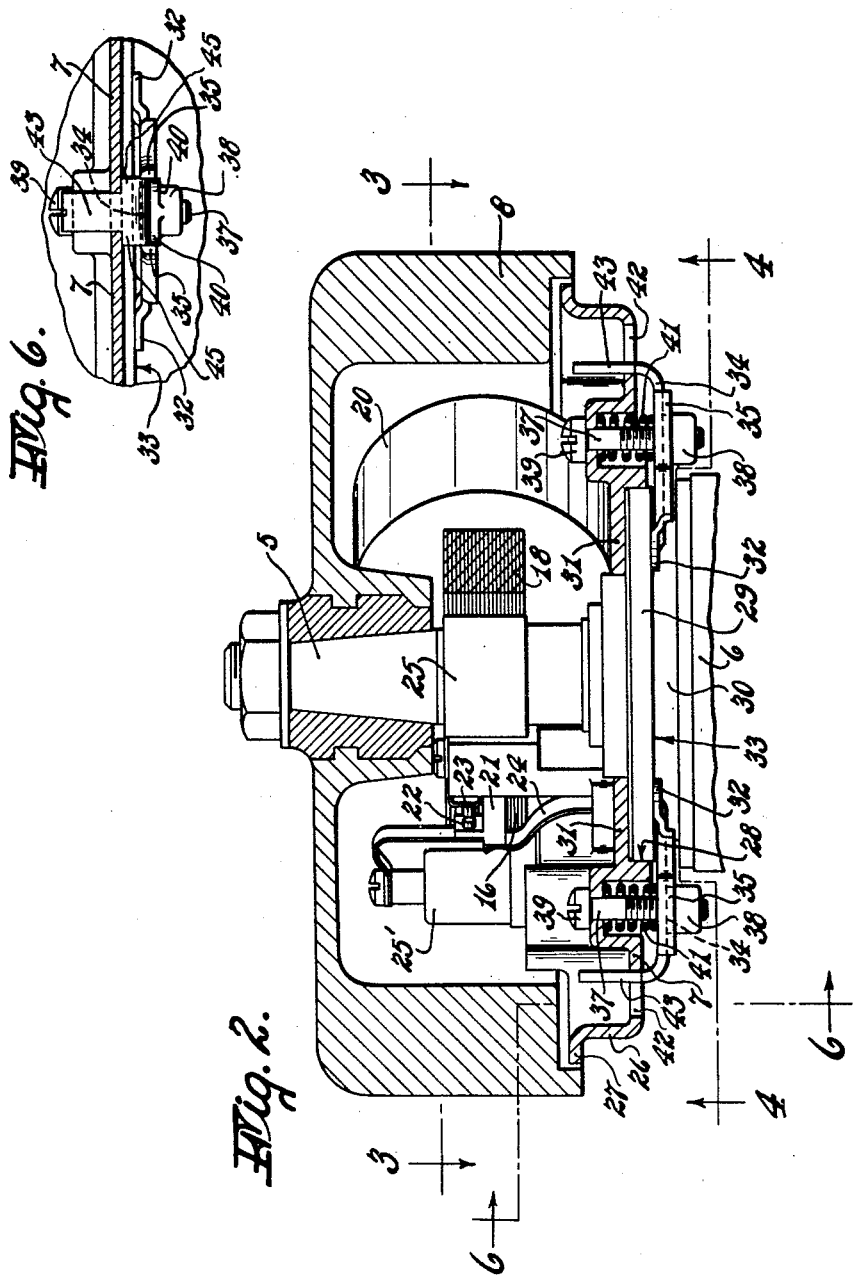
INVENTORS
ALLEN L. BROWNLEE AND
GEORGE F. MCGREVY
BY Chapin + Neal
ATTORNEYS

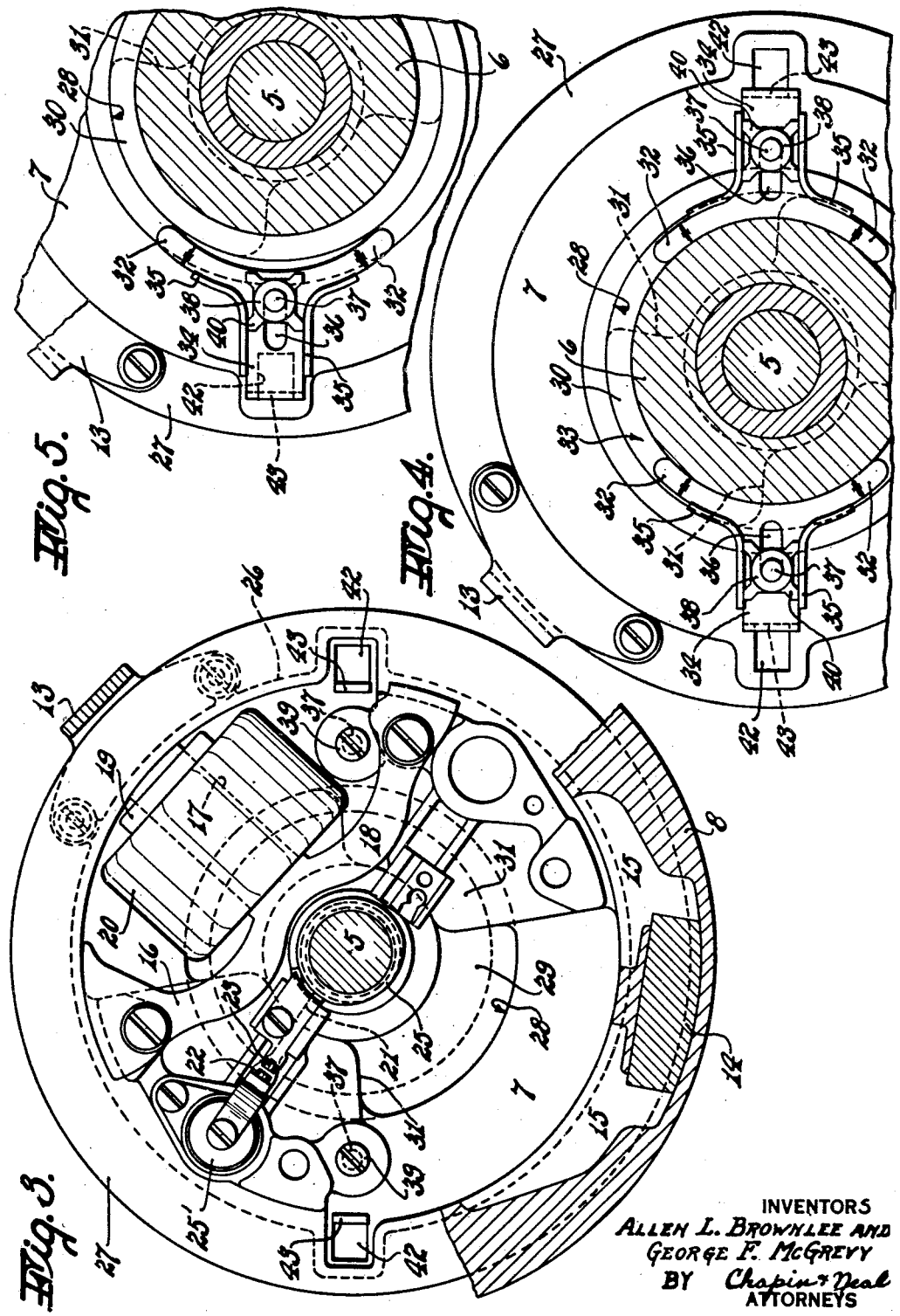

Patented Nov. 8, 1949

2,487,095

UNITED STATES PATENT OFFICE 2,487,095

MOUNTING FOR STATORS OF FLYWHEEL MAGNETOS

Allen L. Brownlee and George F. McGrevy, West Springfield, Mass., assignors to Wico Electric Company, West Springfield, Mass., a corporation of Massachusetts Application September 22, 1948, Serial No. 50,518

5 Claims. (Cl. 171—209)

1

This invention relates to an improved mounting for the stators of flywheel magnetos, which are to be used on engines of the variable spark type as distinguished from the fixed spark type.

An outboard motor is an example of an engine of the type described and one for which the present invention is especially adapted. In an engine of this type, the stator of the magneto has to be swung around the axis of the crankshaft through a wide angular range, sometimes as much as ninety degrees, in order to get the desired spark control. It has been customary heretofore to mount the stator for swinging movement on a hub on the engine crankcase that carries a bearing for the engine crankshaft. To retain the stator on such hub against axial movement thereon, retaining members have been provided on the under side of the stator to be moved into a circumferential groove in the crankcase hub. Such members have to be moved into the groove to fasten the stator on its hub and out of the groove to release the stator for removal from its hub. Heretofore, it has been necessary to move said members by working from below the stator in the narrow space between its inner face and the engine crankcase. Ordinarily, the stator is located at the bottom of a well, which is surrounded by the gasoline supply tank of the motor and which contains the engine flywheel. The engine itself is enclosed by cowling, which has to be removed in part to gain access to the narrow space described. Movement of the retaining members is difficult because of close space limitations without the use of special tools.

This invention has for an object the provision of an improved mounting means for the stator plate of a flywheel magneto, characterized in that the retaining members may be moved into and out of such groove, by working from above the stator in the aforesaid well after the flywheel of the magneto has been removed.

The invention also has for an object the provision of retaining members for the purpose described, consisting of spring fingers, which are adapted to frictionally engage one wall of said groove, such spring fingers being movable toward and away from such wall by means accessible from above the stator and in said well, such means also enabling the spring pressure of such fingers on said wall to be readily adjusted as desired.

These objects will best be understood as the detailed description of one example of the invention proceeds. One illustrative example of the invention is shown in the accompanying drawings, in which:

2

Fig. 2 is a sectional elevational view of the flywheel magneto drawn to a larger scale and showing in detail the mounting of the stator plate of the magneto;

Figure 1:
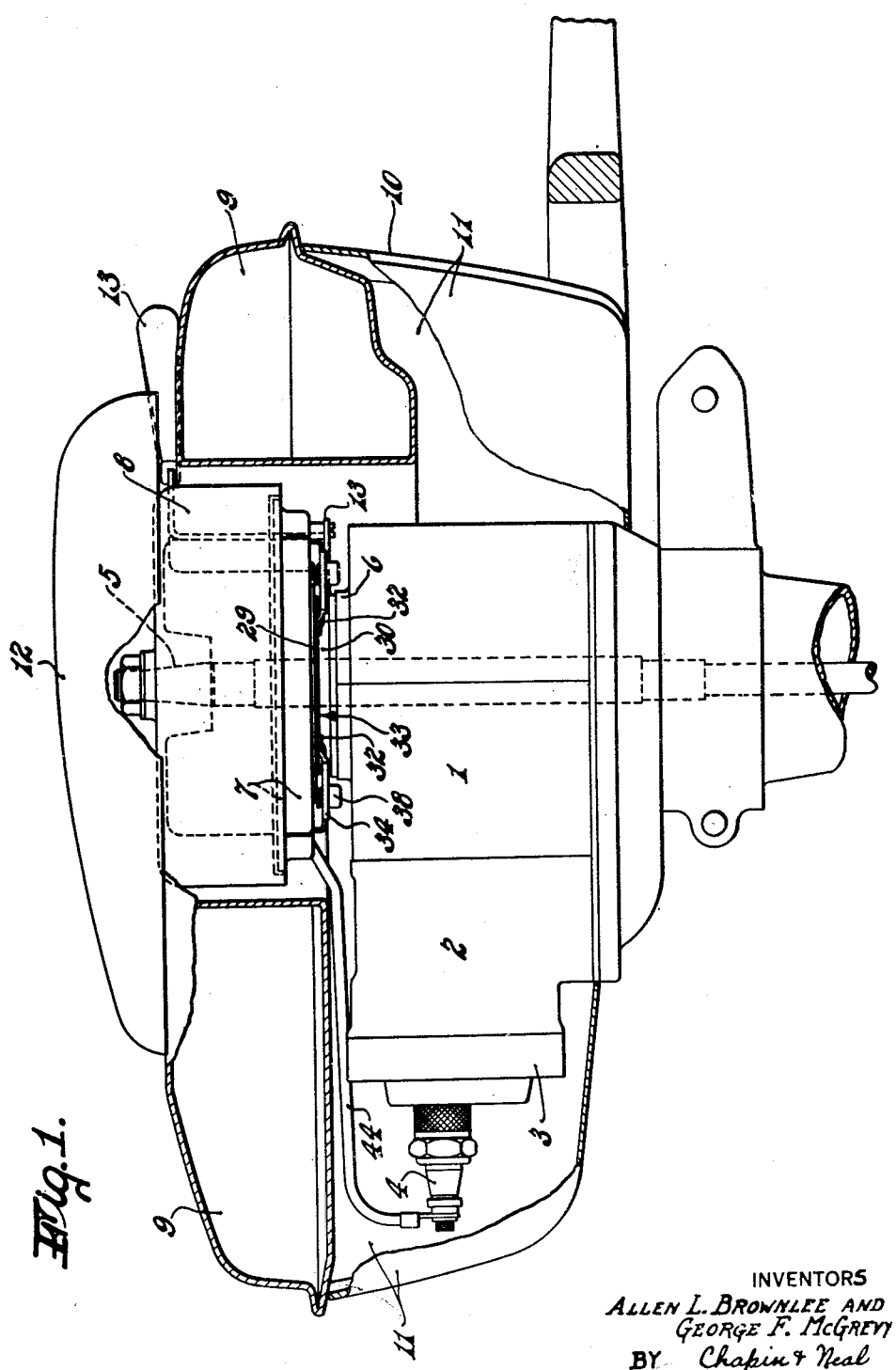
Fig. 1 is a fragmentary sectional elevational view of an outboard motor equipped with a flywheel magneto embodying the invention.

Figs. 3 and 4 are fragmentary sectional top and bottom plan views respectively taken on the lines 3—3 and 4—4, respectively of Fig. 1;

Fig. 5 is a fragmentary bottom plan view taken similarly to Fig. 4 but showing the retaining fingers in released position; and Fig. 6 is a fragmentary sectional view taken on the line 6—6 of Fig. 2.

Referring to these drawings, Fig. 1 shows a portion of an outboard motor, having for ignition a flywheel magneto, which embodies the improvements of this invention. The motor, in this case, is a two-cycle, single-cylinder, internal combustion engine, of which the crankcase is shown at 1, the cylinder at 2, the cylinder head at 3, the spark plug at 4, and the crankshaft at 5. The crankshaft extends vertically upward through a bearing in a hub 6 on the upper side of the crankcase, through the stator plate 7 of the magneto and above the latter to carry the flywheel 8 which is fixed thereto and which also serves as the magnetic rotor of the magneto. The gasoline supply tank for the engine is shown at 9. It closely encompasses the flywheel 8. The engine, and the various accessories used with it, are located beneath tank 9 and are enclosed by cowling, including a fixed end panel 10 and two other panels 11, each of which forms a side and part of one end and part of the bottom of the enclosure, and both of which are removable. The gasoline tank forms the top wall of the enclosure. Upon the top of the gasoline tank 9 is a member 12, covering the well, in which the flywheel magneto is located, and carrying the starting mechanism for the engine. The timing lever for the engine is shown at 13. From its outer and handled end, it extends horizontally inward, then vertically downward through the gap between the flywheel 8 and tank 9 and then horizontally inward and in under the stator plate 7, being suitably fixed thereto as indicated in Fig. 1 and as more completely shown in Figs. 3 and 4. By swinging the lever 13, the stator plate 7 may be swung about the axis of the crankshaft 5 to vary the timing of the spark produced by the magneto, all in the usual and well known manner.

The magneto elements are shown in Figs. 2 and 3. A permanent magnet 14 (Fig. 3) and two pole shoes 15, fixed one to each polar end thereof, are carried by the non-magnetic flywheel 8. The shoes 15 are adapted during rotation of the flywheel, to cooperate with a suitable core structure carried by the stator plate 7. As shown in Fig. 2 such structure is of laminated iron and as shown in Fig. 3, it has three angularly spaced legs 16, 17 and 18, the inner ends of which are magnetically interconnected and the convex outer end faces of which are adapted to magnetically connect successively with the concave inner faces of the pole shoes 15. The central leg 17 bears primary and secondary coils 19 and 20. The breaker mechanism for controlling the circuit of the primary coil 19, includes a slide 21, which carries a contact 22 to cooperate with a stationary contact 23. A spring 24, shown in Fig. 2, tends to hold the contacts 22 and 23 engaged. They are periodically separated, during rotation of the rotor, by a cam 25 fixed to the crankshaft 5. The usual condenser is shown at 25'. These magneto elements, as herein shown, are constructed and arranged, as disclosed in the Alstrom and Brownlee Patent No. 2,447,727 granted August 24, 1948, to which reference is made for a more complete disclosure, if necessary or desired. Obviously, other arrangements of magneto elements may be used because the present invention relates to the mounting of the stator plate 7 on the engine crankcase and not to any one particular arrangement of magneto elements on such plate.

The stator plate is generally circular in form (Fig. 3) with an upstanding marginal rim 26 (Figs. 2 and 3) from the upper edge of which an annular flange 27 projects outwardly into a recess formed in the lower end face of the rim of the flywheel. The stator plate has a central recess (Figs. 2 and 4) which has a cylindrical wall 28 to receive and closely fit the peripheral surface of a pilot flange 29, formed on the described crankcase hub 6. This flange is separated from the rest of the hub by a deep circumferential groove 30. The stator plate has an end wall portion 31 (Figs. 2 and 3) adapted to rest on the outer and upper end face of flange 29. This pilot flange serves to accurately locate the stator plate 7 in coaxial relation with the engine crankshaft 5 so that the convex outer ends of the core legs 16, 17 and 18 (Fig. 3) will lie in true coaxial relation with the concave polar surfaces of the pole shoes 15 with a uniform air gap therebetween. It is necessary to hold the stator plate against axial displacement on the pilot flange 29. This is effected, as has been done heretofore, by spring fingers 32, which are carried by the stator plate and press against the inner annular end wall 33 of the pilot flange. These fingers, as will be clear from Fig. 2, draw the end wall 31 against the outer end face of the pilot flange 29 and hold it squarely at right angles to the axis of the crankshaft 5. The fingers also prevent axially upward movement of the stator plate 7 and frictionally hold it in the various angular positions to which it may be moved by the timing lever 13.

This invention has to do with the mounting of the spring fingers 32 on the stator plate 7 so that they may be easily and conveniently moved into and out of groove 30 without the aid of special tools and from a position entirely above the stator plate. As shown in Fig. 4, there are two sets of spring fingers located at diametrically opposite points. Preferably, there are two fingers in each set, spaced substantially 90 degrees apart. The result is that the inner annular wall 33 is engaged by four spring fingers 32 acting at four locations which are spaced 90 degrees apart.

Each set of spring fingers is carried by a radially slidable member 34 and, as shown in Fig. 4, both fingers and the member are formed in one piece as a stamping of sheet metal. A stiffening rib 35 emborders each side edge of member 34 and curves around to emborder part of the upper edge of the adjacent finger, up to the active portion thereof which presses against the surface 33. These downturned ribs 35 stiffen up the one-piece stamping giving it rigidity, where required, tending to prevent flexing of the metal except at the ends of the fingers which bear on surface 33. Each member 34 has a radially elongated slot 36 therethrough to receive a single retaining screw 37. Each screw passes freely through a hole in plate 7 and through a slot 36 and threads into a nut 38. The head 39 (Fig. 2), of each screw is located above plate 7 and engages the upper face thereof. The nut has four ears 40 which engage the ribs 35 and prevent rotation of the nut when the screw is turned. The nut is of the friction stop type, which holds its screw against loosening. To hold each member 34 and its fingers 32 away from the inner or under side of plate 7 and to hold such member engaged with its nut 38, a spring 41 (Fig. 2) is coiled around each screw 37 and acts between the plate and member to move the latter away from the former. Preferably, the under wall of plate 7 has cylindrical depressions therein, one to receive each spring. Plate 7 is also provided with two radial slots 42, having parallel side walls and located one outwardly beyond each of the spring-receiving depressions described. These slots 42 receive, one in each, ears 43 which are upwardly turned, one from the outer end of each member and which project above the inner face of plate 7 in position to be conveniently actuated from above the plate after the member 12 and flywheel 8 have been removed. Each ear has a lower portion which is wider than the upper portion and slot 42 to afford shoulders 45 for engaging the under side of plate 7 as a fulcrum for the member 34. When a screw 37 is tightened the member 34 swings on the shoulders 45 as a fulcrum and carries the fingers against the surface 30 of flange 29. The shoulders 45 of each member also serve to grip the stator plate and prevent radial movement of such member. The side edges of each ear 43 (Figs. 3 and 6) slidably engage the parallel side edges of its slot 42 and prevent the member 34 from turning, whereby each member can be satisfactorily held by a single retaining screw 37 and yet be free for sufficient radial movement to carry its fingers into and out of slot 30. The member 34 is also guided radially by the engagement of the ears 43 with the side walls of slot 42.

Referring now to Fig. 1, it will be seen that the stator plate 7 is located at the bottom of a deep well formed by the gasoline tank 9. It is also normally enclosed by the cowling 10, 11. Even when one of the panels 11 is removed, as will be necessary in order to connect or disconnect the wire 44, which connects the high tension terminal of the magneto to the spark plug 4, it is difficult to gain access to the space between plate 7 and crankcase 1 to operate the retaining members, which extend into groove 30 to hold the stator plate 7 in place, as was necessary in prior art constructions. This invention avoids such difficulty. With the member 12 and flywheel 8 removed, one can readily remove the stator plate 7 without the use of special tools. Of course, it will be necessary to remove a side panel 11 in order to disconnect spark plug wire 44 but, after this has been done, the rest of the work can be accomplished easily, quickly and conveniently by working from above the stator plate 7 in the described well. An ordinary screw driver is the only tool required. One loosens the two screws 37 (Fig. 2), the heads 39 of which lie above plate 7 so as to be easily accessible. As the screws are loosened, the springs 41 push the members 34 downwardly and the spring fingers 32 will be carried downwardly therewith. As soon as the fingers are disengaged from end wall 33, they are moved radially outwardly by means of the ears 43, which project upwardly through and beyond the upper or outer face of plate 7 for this purpose. These ears may be moved by a finger of the operator or by endwise pressure of a screw driver. The stator plate 7 may thus be quickly and easily released so that it can be lifted upwardly out of the well for inspection, servicing or repair.

Replacing of the stator plate 7 is as easily effected. The fingers 32, if not already so positioned, are moved to their outermost radial positions (shown in Fig. 5) in which they lie wholly outside the groove 30 and outwardly of the cylindrical wall 28 of the recess. The springs 41 will hold the fingers 32 down and separated from plate 7 sufficiently so that they will clear the lower wall 30 of flange 29 when pushed radially inward. The stator plate, with the spark plug wire 44 depending therefrom, is lowered into the described well. The wire is guided to one side, while the plate is lowered into place on the pilot flange 29 until its end wall portions 31 rest on the upper end face of the pilot flange. Then, with a screw driver the operator pushes the ears 43 inwardly as far as possible, thereby moving the fingers 32 into groove 30. The operator then tightens the screws 37 until the fingers 32 are engaged with the end wall 33 of the pilot flange and drawn against such wall with the proper pressure, which can be determined by turning the stator plate 7 and thus testing its resistance to angular displacement. It is to be noted that the pressure of the spring fingers 32 on the inner wall 33 of the pilot flange 29 may be varied as desired to suit different conditions, the pressure being adjustable by turning the screws 37. Having tightened these screws so as to get the desired pressure of the fingers 32 on the inner end face 33 of the pilot flange, the fingers will be held against radial movement and the stator plate is thus held to the pilot flange, properly and accurately located with reference to the axis of the crankshaft. The spark plug wire 44 is connected and the panel 11 replaced. The flywheel 8 is remounted on crankshaft 5 and the member 12 applied to complete the enclosure.

The invention thus provides an improved mounting for the stator plate of a flywheel magneto, which enables the plate to be frictionally held in various positions of angular adjustment on the pilot hub of an engine crankcase and which enables the plate to be easily, quickly and conveniently removed from or replaced on such hub by means accessible from the outer side of such plate.

We claim:

1. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions, in which their spring fingers project inwardly beyond the cylindrical wall of said recess to positions in which the spring fingers lie wholly outside such wall, said plate having radial openings therethrough one for each said member, each member having a part extending into said opening and accessible from the outer face of the plate for moving the member radially from one of said positions to the other, and screws and nuts one each for each member for holding the members in the first-named radial positions, each screw passing freely through the stator plate with its head engaging the outer face thereof and threading into its nut, each nut being operatively engaged with its member to draw the same toward said plate, the head of each screw being accessible from the outer face of the stator plate.

2. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions, in which their fingers project inwardly beyond the cylindrical wall of said recess to positions in which the fingers lie wholly outside such wall, said plate having radial openings therethrough one for each said member, each member having a part extending into said opening and accessible from the outer face of the plate for moving the member radially from one of said positions to the other, and screws and nuts one each for each member for drawing the members toward said plate to carry the fingers against the inner end face of the pilot flange, each screw passing freely through the stator plate with its head engaging the outer face thereof and threading into its nut, the nuts being operatively engaged with the members to draw the same toward the plate and carry the fingers against said inner end face of the pilot flange when the screws are tightened and thereby adjust the pressure of the fingers on said inner end face.

3. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate and adapted to engage the inner end face of said pilot flange to hold the plate against axial displacement and to frictionally hold the plate in various positions of angular adjustment, said members being mounted on the stator plate for movement radially of said recess from positions, in which their fingers project inwardly beyond the cylindrical wall of said recess to positions in which the fingers lie wholly outside such wall, said plate having radial openings therethrough one for each said member, each member having a part extending into said opening and accessible from the outer face of the plate for moving the member radially from one of said positions to the other, screws and nuts one each for each member for drawing the members toward said plate to carry the fingers against the inner end face of the pilot flange, each screw passing freely through the stator plate with its head engaging the outer face thereof and threading into its nut, said nuts being operatively engaged with their members to draw the latter toward said plate and move the fingers against said inner end face of the pilot flange when the screws are tightened and thereby adjust the pressure of the fingers on said inner end face, and coil springs one for each screw, each spring being coiled around its screw and acting between the inner face of the stator plate and its member to hold the latter spaced away from said inner face in position to be freely moved radially inward into said first-named position without engaging the periphery of said pilot flange.

4. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from a position in which their fingers project inwardly beyond the cylindrical wall of said recess to a position in which the fingers lie wholly outside such wall, said plate having radial slots therethrough one for each said member, each such slot having parallel side walls, each member having a part extending into a slot and slidably engaged with said parallel side walls to guide it in a radial path in its movement from one of said positions to the other, each said part being accessible from the outer face of the plate for moving its member radially from one to the other of said positions, and screws and nuts one each for each member for drawing the members toward said plate and the fingers against the inner end face of the pilot flange, each screw passing freely through the stator plate with its head engaging the outer face thereof and threading into its nut, said nuts being operatively engaged with their members to draw the latter toward the plate and the fingers against said inner end face of the pilot flange when the screws are tightened and thereby adjust the pressure of the fingers on said inner end face.

5. A stator plate for a flywheel magneto, having a recess with a cylindrical wall adapted to receive and closely fit the periphery of a pilot flange on an engine crankcase and an end wall adapted to engage an outer end face of said pilot flange, a plurality of spring-finger carrying members mounted on the inner face of the plate with the fingers adapted to engage the inner end face of said pilot flange to hold the plate against axial displacement and to frictionally hold the plate in various positions of angular adjustment, said members being mounted on the stator plate for movement radially of said recess from positions, in which their fingers project inwardly beyond the cylindrical wall of said recess to positions in which the fingers lie wholly outside such wall, each member having a part remote from its finger-carrying end and bent toward the plate and engaging the latter as a fulcrum, and screws and nuts one each for each member for swinging members about their fulcrums to press the fingers against the inner end face of the pilot flange, each screw passing freely through the stator plate with its head engaging the outer face thereof and threading into its nut, each nut being operatively engaged with its member to move its finger-carrying end toward and against said inner end face of the pilot flange when its screw is tightened, whereby to adjust the pressure of the fingers on said inner end face.

ALLEN L. BROWNLEE.
GEORGE F. McGREVY.

No references cited.